United States Patent
Ichikawa (10) Patent No.: US 9,143,655 B2
(45) Date of Patent: Sep. 22, 2015

(54) IMAGE PROCESSING APPARATUS AND IMAGE PROCESSING SYSTEM

(71) Applicant: Kazuki Ichikawa, Gamagori (JP)

(72) Inventor: Kazuki Ichikawa, Gamagori (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/158,910

(22) Filed: Jan. 20, 2014

(65) Prior Publication Data

US 2014/0240746 A1 Aug. 28, 2014

(30) Foreign Application Priority Data

Feb. 25, 2013 (JP) ................................. 2013-034671

(51) Int. Cl.
| | |
|---|---|
| *G06F 3/12* | (2006.01) |
| *G06F 15/16* | (2006.01) |
| *G06F 15/167* | (2006.01) |
| *G06K 9/40* | (2006.01) |
| *H04N 1/44* | (2006.01) |

(52) U.S. Cl.
CPC ........... *H04N 1/4406* (2013.01); *H04N 1/4413* (2013.01); *H04N 1/4426* (2013.01); *H04N 1/4433* (2013.01); *H04N 2201/0094* (2013.01)

(58) Field of Classification Search
USPC ................... 358/1.14, 1.15; 709/223, 999.01
See application file for complete search history.

(56) References Cited

U.S. PATENT DOCUMENTS

| | | | | |
|---|---|---|---|---|
| 8,441,659 | B2 * | 5/2013 | Homma ...................... | 358/1.14 |
| 2003/0233437 | A1 * | 12/2003 | Kitada et al. .................. | 709/223 |
| 2006/0173990 | A1 * | 8/2006 | Kitada et al. .................. | 709/223 |
| 2008/0007758 | A1 * | 1/2008 | Miyashita .................... | 358/1.14 |
| 2010/0182639 | A1 * | 7/2010 | Sakai .......................... | 358/1.15 |

FOREIGN PATENT DOCUMENTS

| | | | |
|---|---|---|---|
| JP | 2007-102531 | * | 4/2007 |
| JP | 2007-102531 A | | 4/2007 |
| JP | 2011-107843 A | | 6/2011 |

* cited by examiner

*Primary Examiner* — Akwasi M Sarpong
(74) *Attorney, Agent, or Firm* — Banner & Witcoff, Ltd.

(57) ABSTRACT

A receiver is configured to receive input of authentication information of a user. A communicator is configured to perform communication with a server that performs user authentication. An image processor has at least one image processing function. A memory stores authentication information of the user and stores instructions. A processor performs: a selection process of selecting which of the server and the image processing apparatus itself performs the user authentication, based on the authentication information received by the receiver; an authentication process of causing an apparatus selected in the selection process to perform the user authentication based on the authentication information received by the receiver; and a permission process of permitting the image processor to perform image processing if the user authentication by the authentication process succeeds and prohibiting the image processor from performing image processing if the user authentication by the authentication process fails.

12 Claims, 7 Drawing Sheets

| ID | USER NAME | PASSWORD | RESTRICTION INFORMATION | | | | SERVER AUTHENTICATION |
|---|---|---|---|---|---|---|---|
| | | | PRINT | COPY | FAX | SCAN | |
| 0001 | User1 | QWER | YES | YES | YES | YES | - |
| 0002 | User2 | TYUI | YES | YES | NO | YES | - |
| 0003 | User3 | OPAS | NO | YES | NO | YES | REQUIRED |
| 9999 | UNREGISTERED | - | NO | NO | NO | YES | REQUIRED |

| ID | USER NAME | PASSWORD |
|---|---|---|
| 0001 | User1 | 1234 |
| 0002 | User2 | 5678 |
| 0003 | User3 | 9012 |
| 0004 | User4 | 3456 |
| 0005 | User5 | 7890 |

| ID | USER NAME | PASSWORD | RESTRICTION INFORMATION | | | | SERVER AUTHENTICATION |
|---|---|---|---|---|---|---|---|
| | | | PRINT | COPY | FAX | SCAN | |
| 0001 | User1 | QWER | YES | YES | YES | YES | – |
| 0002 | User2 | TYUI | YES | YES | NO | YES | – |
| 0003 | User3 | OPAS | NO | YES | NO | YES | REQUIRED |
| 9999 | UNREGISTERED | – | NO | NO | NO | YES | REQUIRED |

FIG. 4

| IMAGE PROCESSING | SPECIFIC FUNCTION |
|---|---|
| FAX | YES |
| COPY | NO |
| SCAN | NO |
| PRINT | NO |

LOGIN SCREEN

PLEASE INPUT USER INFORMATION.  ENTER — 42

CANCEL — 43

41 — USER NAME: UserA

PASSWORD: ****

IMAGE PROCESSING APPARATUS AND IMAGE PROCESSING SYSTEM

CROSS REFERENCE TO RELATED APPLICATIONS

This application claims priority from Japanese Patent Application No. 2013-034671 filed Feb. 25, 2013. The entire content of the priority application is incorporated herein by reference.

TECHNICAL FIELD

The invention relates to an image processing apparatus and an image processing system.

BACKGROUND

Conventionally, in an image processing system having an image processing apparatus and a server, technology is known that restricts execution of image processing based on information of a user authenticated by the server. In such an image processing system, authentication information is transmitted from the image processing apparatus to the server, user authentication is performed at the server, and the image processing apparatus is permitted to execute a job of performing image processing on condition that a success result of the user authentication is received from the server.

In such system, there is disclosed technology for a multifunction peripheral connected to an authentication server. The multifunction peripheral receives input of authentication information through a login operation, requires user authentication of the authentication server based on the authentication information, and permits usage of the multifunction peripheral on condition that a success result of the user authentication is received from the authentication server.

SUMMARY

However, the above-described conventional technology has the following problem. That is, the image processing apparatus acquires the result of user authentication from a server connected to the apparatus via a network, and subsequently starts execution of a job. Hence, if it takes time to acquire the result of user authentication, start of execution of the job is delayed.

In view of the foregoing, the invention provides an image processing apparatus. The image processing apparatus includes a receiver, a communicator, an image processor, a processor, and a memory. The receiver is configured to receive input of authentication information of a user. The communicator is configured to perform communication with a server that performs user authentication. The image processor has at least one image processing function. The memory stores authentication information of the user and stores instructions. When executed by the processor, the instructions cause the processor to perform: a selection process of selecting which of the server and the image processing apparatus itself performs the user authentication, based on the authentication information received by the receiver; an authentication process of causing an apparatus selected in the selection process to perform the user authentication based on the authentication information received by the receiver; and a permission process of permitting the image processor to perform image processing if the user authentication by the authentication process is successful, and of prohibiting the image processor from performing image processing if the user authentication by the authentication process is failed.

According to another aspect, the invention provides an image processing apparatus. The image processing apparatus includes a receiver, a communicator, an image processor, a processor, and a memory. The receiver is configured to receive input of authentication information of a user. The communicator is configured to perform communication with a server that performs user authentication. The image processor has at least one image processing function. The memory stores authentication information of the user and stores instructions. When executed by the processor, the instructions cause the processor to perform: a selection process of selecting which of the server and the image processing apparatus itself performs the user authentication, based on execution information indicative of whether a specific function of the image processor is permitted; an authentication process of causing an apparatus selected in the selection process to perform the user authentication based on the authentication information received by the receiver; and a permission process of permitting the image processor to perform image processing if the user authentication by the authentication process is successful, and of prohibiting the image processor from performing image processing if the user authentication by the authentication process is failed.

According to still another aspect, the invention provides an image processing system. The image processing system includes an image processing apparatus and a server. The image processing apparatus has at least one image processing function. The server stores user information that identifies a user. The image processing system is configured to perform: a selection process of selecting which of the server and the image processing apparatus performs user authentication, based on authentication information received by the image processing apparatus; an authentication process of causing an apparatus selected in the selection process to perform the user authentication based on the authentication information received by the image processing apparatus; and a permission process of permitting the image processing apparatus to perform image processing if the user authentication by the authentication process is successful, and of prohibiting the image processing apparatus from performing image processing if the user authentication by the authentication process is failed.

BRIEF DESCRIPTION OF THE DRAWINGS

Embodiments in accordance with the invention will be described in detail with reference to the following figures wherein.

DETAILED DESCRIPTION

An image processing system according to an embodiment will be described in detail while referring to the attached drawings. In the present embodiment, the invention is applied to an image processing system including an authentication server that performs user authentication and including a multifunction peripheral (MFP) having a plurality of functions relating to image processing.

[Overall Configuration of Image Processing System]

Figure 1:
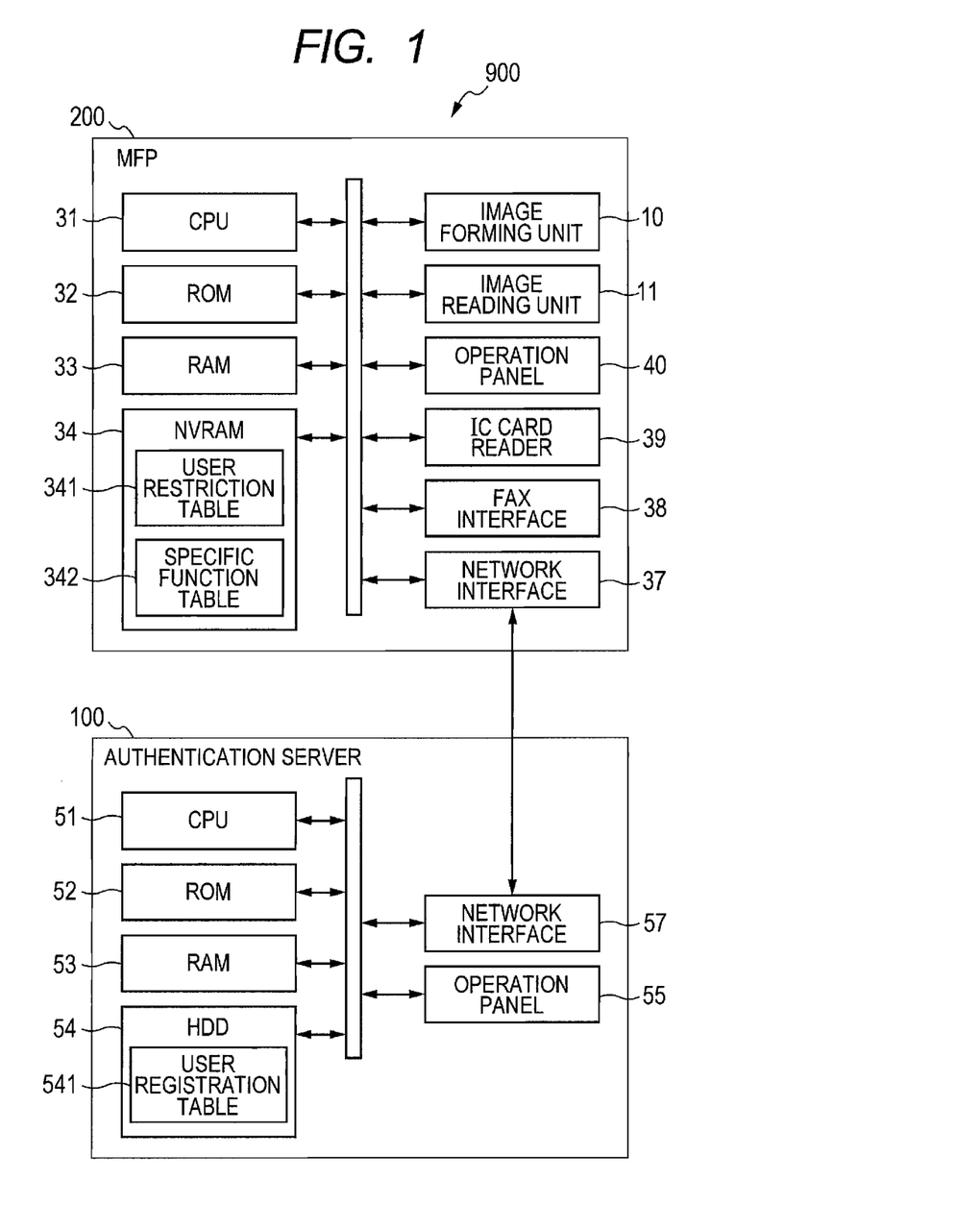
FIG. 1 is a block diagram showing the configuration of an image processing system according to an embodiment.

As shown in FIG. 1, the image processing system 900 of the present embodiment (an example of the image processing system) includes an authentication server 100 (an example of the server) and an MFP 200 (an example of the image processing apparatus). The MFP 200 has a plurality of functions relating to image processing, such as printing, reading (scanning), and the like. Further, the MFP 200 outputs an authentication request to the authentication server 100, or the MFP 200 itself performs user authentication and, based on the authentication result, restricts execution of image processing. In response to the authentication request, the authentication server 100 performs user authentication based on user information attached to the authentication request, and returns the result.

In the image processing system 900, an arbitrary number of image processing apparatuses having an image processing function may be connected, in addition to the MFP 200. Also, an arbitrary number of authentication servers performing user authentication may be connected, in addition to the authentication server 100.

[Configuration of Authentication Server]

Next, the schematic configuration of the authentication server 100 will be described. As shown in FIG. 1, the authentication server 100 includes a CPU 51, a ROM 52, a RAM 53, and a HDD 54. Further, the authentication server 100 includes an operation panel 55 having both a displaying function and an inputting function, and a network interface 57 that enables communication with an external apparatus. The operation panel 55 and the network interface 57 are controlled by the CPU 51.

The HDD 54 of the authentication server 100 stores various programs and data, such as an OS (operating system), a browser for viewing data on the Internet, device drivers for controlling various drivers, and the like.

Figure 2:
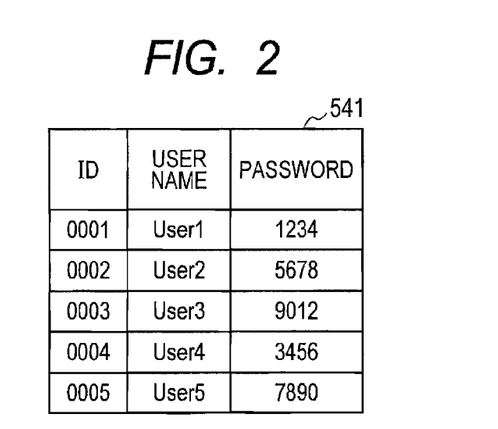
FIG. 2 is a view showing the configuration of a user registration table in an authentication server.

The HDD 54 further stores a user registration table 541 shown in FIG. 2, as information for performing user authentication. Specifically, the user registration table 541 stores records each including three items of an identification number (ID), a user name, and a password. Note that the configuration of the record of the user registration table 541 is not limited to that described above, and may include another item. Also, the record only needs to include information for identifying a user, and does not need to include all of the user name and the password.

The CPU 51 performs various processes in accordance with control programs read out from the ROM 52 and programs read out from the HDD 54, while storing the arithmetic results in the RAM 53 or the HDD 54.

The network interface 57 is an interface that enables communication with another apparatus. The authentication server 100 can perform transmission/reception of data to/from the MFP 200 via the network interface 57.

[Configuration of MFP]

Next, the schematic configuration of the MFP 200 will be described. As shown in FIG. 1, the MFP 200 includes a CPU 31 (an example of the controller), a ROM 32, a RAM 33, and an NVRAM (non-volatile RAM) 34. The MFP 200 further includes an image forming unit 10 (an example of the image processor) that prints an image on paper, an image reading unit 11 (an example of the image processor) that reads (scans) an image on an original document, an operation panel 40 (an example of the receiver) having both a displaying function and an inputting function, a FAX interface 38, a network interface 37 (an example of the communicator), and an IC card reader 39 (an example of the receiver) that reads information of an IC card. These units are controlled by the CPU 31.

The image forming unit 10 may be a type capable of color printing, or may be a type only capable of monochromatic printing. In the present embodiment, the image forming unit 10 is a type capable of color printing. As to the printing method, the image forming unit 10 may be of an electrophotographic method or may be of an inkjet method. Further, the image reading unit 11 may be a type capable of color scan, or may be a type only capable of monochromatic scan. In the present embodiment, the image reading unit 11 is a type capable of color scan. Also, the reading mechanism may be CCD or CIS.

The ROM 32 stores firmware that is a control program for controlling the MFP 200, various settings, default values, and the like. The RAM 33 and the NVRAM 34 are used as work areas to which various control programs are read out, or as storage areas in which data is stored temporarily.

The CPU 31 controls each element of the MFP 200, while storing the processing results in the RAM 33 and the NVRAM 34 in accordance with the control programs read out from the ROM 32 and signals sent from various sensors.

The network interface 37 and the FAX interface 38 are interfaces that enable communication with other apparatuses. The MFP 200 transmits an authentication request to the authentication server 100 and receives an authentication result from the authentication server 100, via the network interface 37. The MFP 200 also performs transmission/reception of FAX data via the FAX interface 38.

The operation panel 40 is provided at the exterior of the MFP 200. The operation panel 40 has various buttons for receiving user input and a touch panel for displaying messages and settings. The various buttons include, for example, an OK button for inputting a start instruction of image processing and a cancel button for inputting a cancel instruction of image processing. Further, the touch panel enables the user to touch for various inputs. For example, various settings and user information are inputted through the touch panel.

Figure 3:
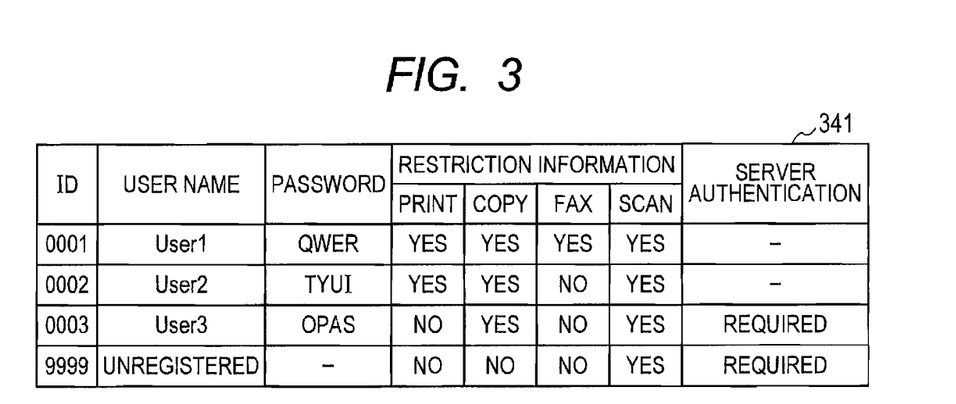
FIG. 3 is a view showing the configuration of a user restriction table in an MFP (multifunction peripheral)

Further, the NVRAM 34 stores a user restriction table 341 shown in FIG. 3, as information for restricting execution of image processing. Specifically, the user restriction table 341 stores records each including five items of an identification number (ID), a user name, a password, restriction information, and server authentication. The identification number is associated with the identification number of the user registration table 541 in the authentication server 100.

The restriction information stores information of whether execution of each image processing of Print, Copy, FAX, and Scan is permitted. In FIG. 3, a "YES" indicates that execution is permitted, and a "NO" indicates that execution is not permitted. Here, "FAX" is a function of reading an original document and transmitting the read image via the FAX interface 38, "Scan" is a function of reading an original document and saving the read image in a file, "Copy" is a function of reading an original document and printing the read image, and "Print" is a function of printing image data that is received from an external apparatus such as a personal computer (PC) via the network interface 37.

The server authentication stores information of whether user authentication by the authentication server 100 is required. In FIG. 3, "Required" indicates that user authentication by the authentication server 100 is required, and a symbol "—" indicates that user authentication by the authentication server 100 is not required or that such setting is not performed.

Here, the record configuration of the user restriction table 341 is not limited to that described above, and may include another item. Also, the configuration of the restriction information is not limited to that described above, and may include another item. Further, it is only necessary that information for identifying a user be associated with restriction information corresponding to the user, and it is not necessary to use all of the user name and the password.

The user restriction table 341 does not need to have all the records corresponding to all users registered in the user registration table 541. For example, it may be so configured that the authentication server 100 stores records of all employees of a company, and that the MFP 200 stores records of employees belonging to a department where the MFP 200 is installed.

The user restriction table 341 also includes a record for an unregistered user that is a user who has succeeded in user authentication by the authentication server 100 but who is not registered in the user restriction table 341. The record of the ID "9999" serves as a record for the unregistered user, and has "Unregistered" as the user name. Hereinafter, this record is referred to as "unregistered record". On the other hand, the record of the ID "0001", "0002", etc. for a case where user authentication is performed successfully and the user is identified is referred to as "user specifying record". Because the password of the unregistered user is unknown, the password of the unregistered record is not set.

Figure 4:
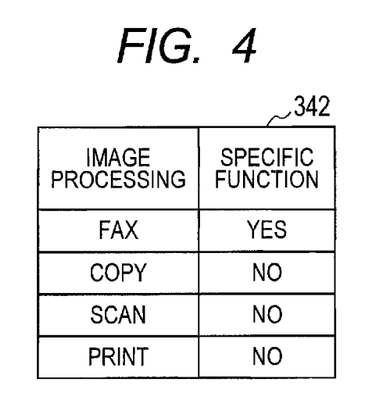
FIG. 4 is a view showing the configuration of a specific function table in the MFP (multifunction peripheral)

As shown in FIG. 4, the NVRAM 34 stores a specific function table 342 that stores whether each image processing that can be executed by the MFP 200 is treated as "specific function". The specific function table 342 stores each image processing in association with a setting (YES, NO) of whether the image processing is treated as the specific function. For example, a function of high confidentiality and a function of high cost are set as the specific function.

Here, for example, for functions requiring high confidentiality, such as reading (scanning) and facsimile transmission, it is preferable to perform strict user authentication by the server. Also, for example, for high-cost image processing, such as color print and color scan, it is preferable to perform strict user authentication by the server. Hence, it is preferable to determine whether to select user authentication by the server, based on whether the specific function is permitted.

[Overall Operations of Image Processing System]

Next, the overall operations of the image processing system 900 will be described. In the image processing system 900, an administrator preliminarily registers user information in the user registration table 541 of the authentication server 100. Further, an administrator preliminarily registers restriction information for each user in the user restriction table 341 of the MFP 200. Further, the administrator preliminarily sets a specific function in the specific function table 342 of the MFP 200. The administrator of the authentication server 100 and the administrator of the MFP 200 may be the same person, or may be different persons.

Figure 5:
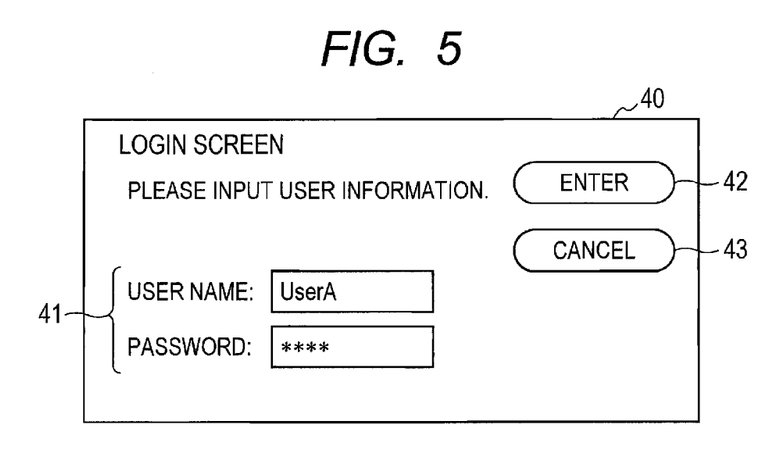
FIG. 5 is a view showing a login screen displayed by the MFP.

The user who wishes to use the MFP 200 logs in to the MFP 200, in order to cause the MFP 200 to execute image processing. The login to the MFP 200 is performed by operating the operation panel 40 to input a login request. In response to input of the login request, the MFP 200 displays a login screen. FIG. 5 shows the login screen displayed on the operation panel 40. The login screen has an input portion 41 for inputting each of a user name and a password, serving as user information, an execution button 42 for entering the inputted user information, and a cancel button 43 for cancelling the login operation. After inputting the user information in the input portion 41, the user touches the execution button 42.

The input method of the user information is not limited to an inputting operation on the operation panel 40. An IC card storing user information may be set at a predetermined reading position of the IC card reader 39. When the IC card is set at the predetermined reading position, the MFP 200 controls the IC card reader 39 to read the user information stored in the IC card.

After acquiring the user information, the MFP 200 selects whether to make a request for performing user authentication to the authentication server 100 or to perform user authentication by the MFP 200 itself. Then, the selected apparatus performs user authentication based on the inputted user information. In accordance with the authentication result, the MFP 200 extracts a record from the user restriction table 341. The MFP 200 enables image processing to be executed within a range that is permitted by the restriction information of the extracted record.

[First Embodiment]

Next, a login request process executed by the MFP 200 for realizing the above-described operations of the image processing system 900 will be described while referring to FIG. 6. The CPU 31 executes the login request process, triggered by input of a login request from the user.

In the login request process, first, the CPU 31 allows selection of a method of inputting user information, and acquires the user information that is inputted in accordance with the selected method (S101). The input method includes direct input to the login screen on the operation panel 40 and automatic input by the IC card reader 39. Specifically, in S101, in case of the direct input, the user name and the password are acquired. In case of the automatic input, the ID is acquired. Here, the password acquired in S101 is the password for user authentication performed by the MFP 200 itself, that is, the password referred to in the user restriction table 341, and is not the password stored in the authentication server 100.

Subsequent to S101, the CPU 31 determines whether there is user registration (that is, whether the user is registered) in the MFP 200 itself, based on the acquired user name or ID (S102). In S102, the CPU 31 refers to the user restriction table 341. If there is a record of which the same information is stored as the acquired user name or ID, the CPU 31 determines that there is user registration in the MFP 200 itself. If there is no such record, the CPU 31 determines that there is no user registration in the MFP 200 itself.

If there is user registration (S102: YES), the CPU 31 reads out the record of the user, and determines whether the user is a user for which user authentication by the authentication server 100 is required (S103). In S103, the CPU 31 determines whether the item of "server authentication" of the read-out record is "required" and, if it is "required", determines that the user is a user for which user authentication by the authentication server 100 is required (S103: YES).

If the user is not a user for which user authentication by the authentication server 100 is required (S103: NO), the CPU 31 refers to the specific function table 342 and determines whether the user is a user to which execution of the specific function is permitted (S104). In S104, the CPU 31 determines whether, among each image processing item of the restriction information of the read-out record, image processing of "YES" is the specific function set in the specific function table 342. If there is at least one image processing item corresponding to the specific function, the CPU 31 determines that the user is a user to which execution of the specific function is permitted (S104: YES).

If the user is not a user to which execution of the specific function is permitted (S104: NO), the MFP 200 itself performs user authentication (S105). Specifically, in S105, if the password acquired in S101 matches the password of the record read out from the user restriction table 341 in S103, the CPU 31 determines that user authentication is successful. If the passwords do not match, the CPU 31 determines that user authentication is failed. Here, in a case where automatic input is performed by an IC card in S101, step S105 is not necessary. Subsequent to S105, the process moves to S106.

On the other hand, if there is no user registration (S102: NO), user authentication by the MFP 200 cannot be performed. Hence, the CPU 31 requires input of a password needed for user authentication at the authentication server 100, and acquires the inputted password (S121). The CPU 31 also acquires a password needed for user authentication at the authentication server 100 (S121) if the user is a user for which user authentication by the authentication server 100 is required (S103: YES) or if execution of the specific function is permitted (S104: YES). Subsequent to S121, the CPU 31 outputs an authentication request to the authentication server 100 (S122). The ID corresponding to the user name acquired in S101 (or the ID that is directly acquired) and the password acquired in S121 are attached to the authentication request.

Figure 7:
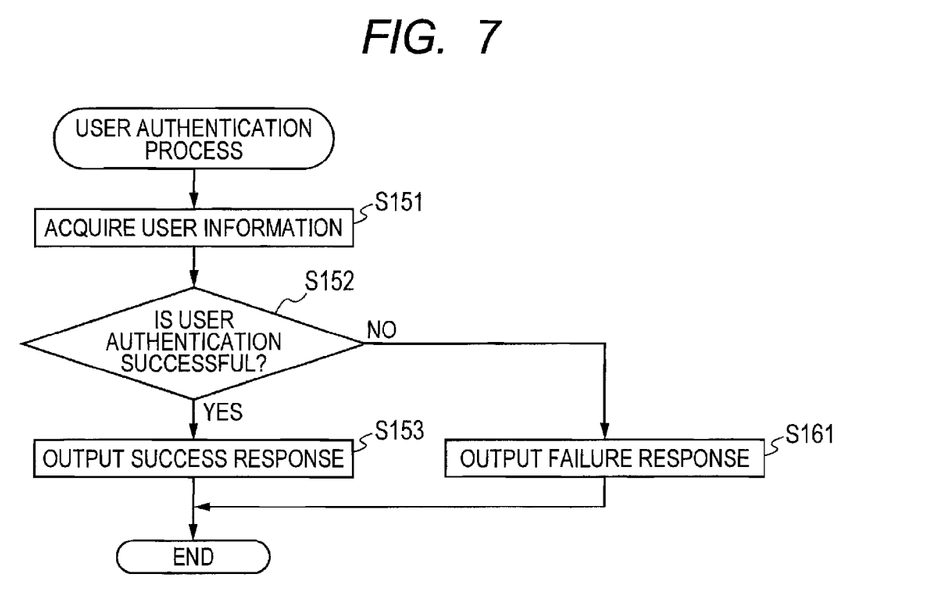
FIG. 7 is a flowchart showing the steps of a user authentication process executed by the authentication server.

Here, the user authentication process executed by the authentication server 100 will be described while referring to FIG. 7. The CPU 51 executes the user authentication process, triggered by reception of the authentication request.

In the user authentication process, first, the CPU 51 acquires user information attached to the authentication request (S151). Specifically, the ID and the password are acquired. Then, the CPU 51 performs user authentication based on the acquired user information, and determines whether user authentication is successful (S152). In S152, the CPU 51 refers to the user registration table 541, and searches for a record of which the ID and the password match the user information acquired in S151. If such a record is found, the CPU 51 determines that authentication is successful. If no such record is found, the CPU 51 determines that authentication is failed.

Subsequent to S152, the CPU 51 transmits the result of user authentication to the sender of the authentication request. That is, if user authentication is successful (S152: YES), the CPU 51 outputs a response that user authentication is successful (S153). On the other hand, if user authentication is failed (S152: NO), the CPU 51 outputs a response that user authentication is failed (S161). Subsequent to S153 or S161, the user authentication process at the authentication server 100 ends.

Figure 6:
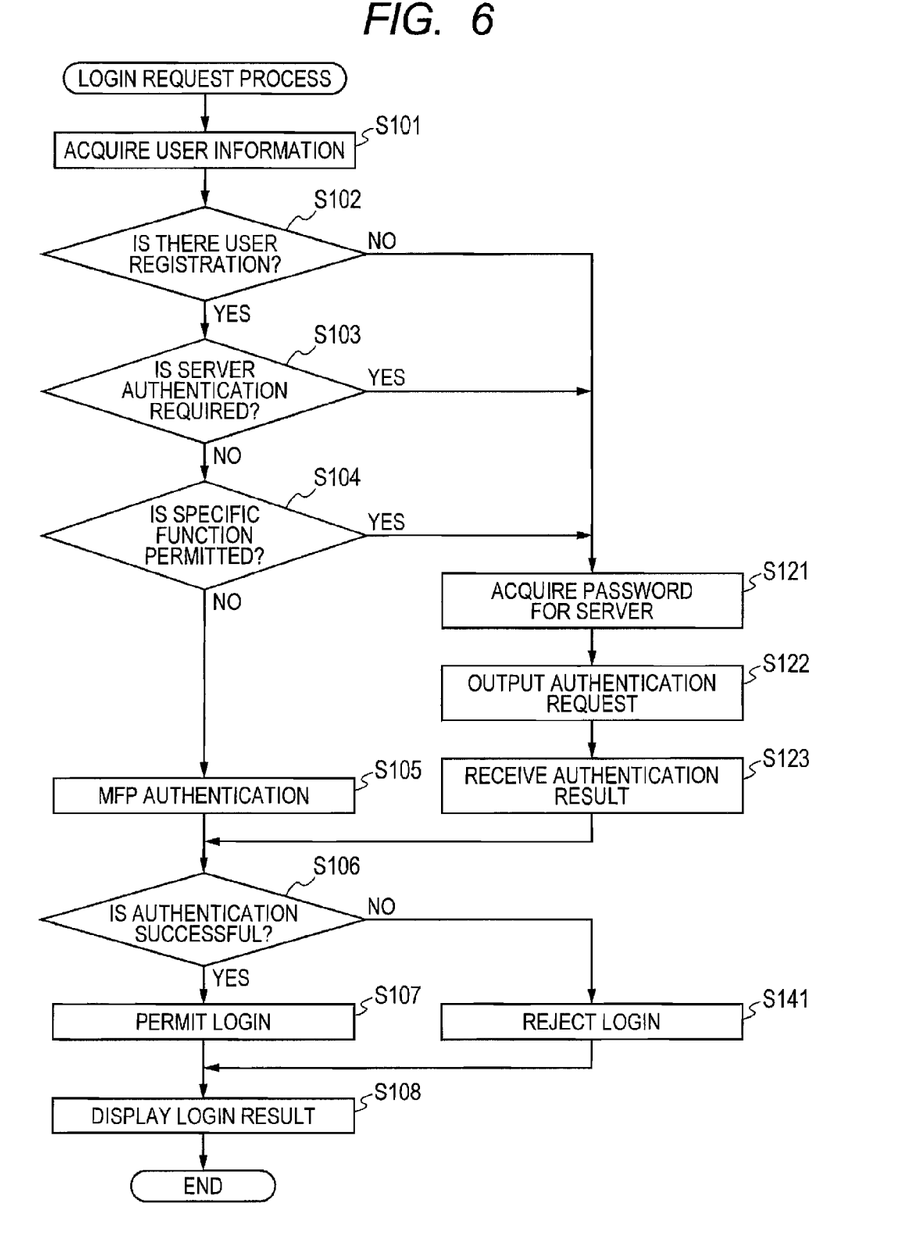
FIG. 6 is a flowchart showing the steps of a login request process executed by the MFP according to a first embodiment.

Returning to the login request process by the MFP 200 in FIG. 6, after outputting the authentication request in S122, the MFP 200 receives the authentication result from the authentication server 100 (S123). Subsequent to S123, the process moves to S106.

After user authentication by the MFP 200 itself is finished in S105 or after the result of user authentication is received from the authentication server 100 in S123, the CPU 31 determines whether user authentication is successful (S106).

If the CPU 31 determines that user authentication is successful (S106: YES), login is permitted (S107). Once login is permitted, the MFP 200 refers to the user restriction table 341, and restricts execution of image processing for each user, based on restriction information included in the user specifying record corresponding to the authenticated user. Here, if there is no corresponding user specifying record, the MFP 200 restricts execution of image processing based on restriction information included in the unregistered record. If the CPU 31 determines that user authentication is failed (S106: NO), login is rejected (S141). If login is rejected, the MFP 200 prohibits execution of all image processing.

Subsequent to S107 or S141, the CPU 31 controls the operation panel 40 to display the result of login (S108). At this time, in S108, the operation panel 40 also displays information of whether each image processing is permitted. Subsequent to S108, the login request process ends. Thus, the process for login is completed.

That is, in the first embodiment, it is selected based on the conditions in steps S102, S103, and S104 whether the apparatus performing user authentication is to be the MFP 200 itself or the authentication server 100. And, when user authentication by the MFP 200 itself is selected, user authentication can be completed more quickly and efficiently, compared with user authentication by the authentication server 100.

In the login request process of the first embodiment, the apparatus performing user authentication is selected based on the three conditions in steps S102, S103, and S104. However, it is not necessary to perform selection based on all of the above three conditions. For example, selection may be performed based on one of these conditions, or based on two of these conditions. Or, selection may be performed based on other conditions. Or, another condition may be added to the above three conditions.

[Second Embodiment]

Figure 8:
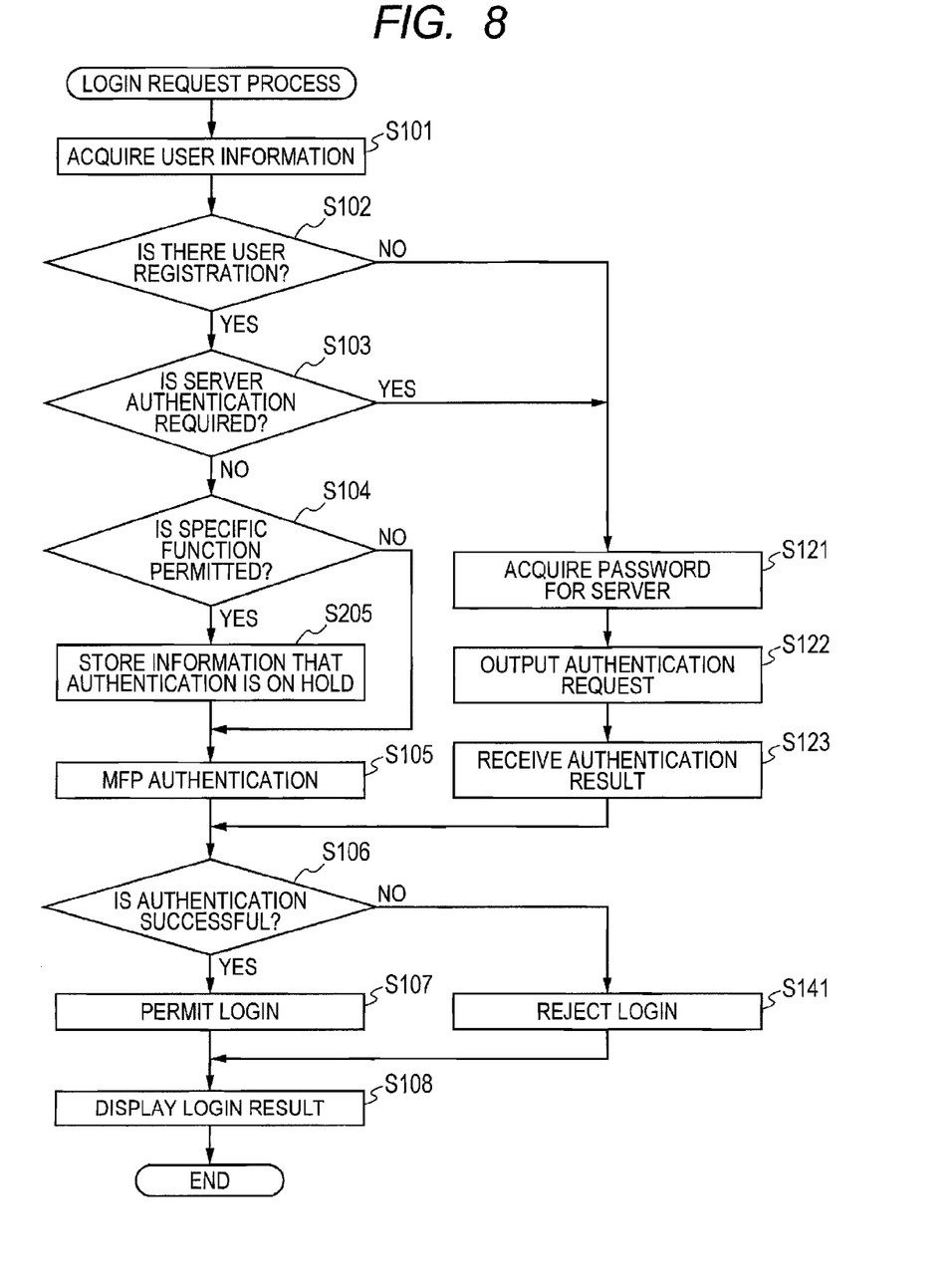
FIG. 8 is a flowchart showing the steps of a login request process executed by an MFP according to a second embodiment.

Next, a login request process executed by the MFP 200 according to a second embodiment will be described while referring to FIG. 8. In the second embodiment, user authentication by the authentication server 100 in the login request process is kept on hold as necessary. And, when user authentication is on hold, the user authentication is performed at the time of execution of a job. The second embodiment differs from the first embodiment in this point. Here, like parts and components in the login request process of the second embodiment are designated by the same reference numerals as those in the first embodiment to avoid duplicating description.

In the login request process of the second embodiment, after the user information is acquired (S101), in a similar manner to the first embodiment, the CPU 31 selects the apparatus performing user authentication in S102, S103, and S104. If there is no user registration (S102: NO), or if the user is a user for which user authentication by the authentication server 100 is required (S103: YES), the authentication server 100 performs user authentication (S121 to S123).

On the other hand, if execution of the specific function is permitted (S104: YES), in the second embodiment, information is stored that user authentication by the authentication server 100 is kept on hold (S205). Subsequent to S205, the process moves to S105, and user authentication by the MFP 200 is performed. The login request process in S106 and thereafter is the same as the first embodiment.

Figure 9:
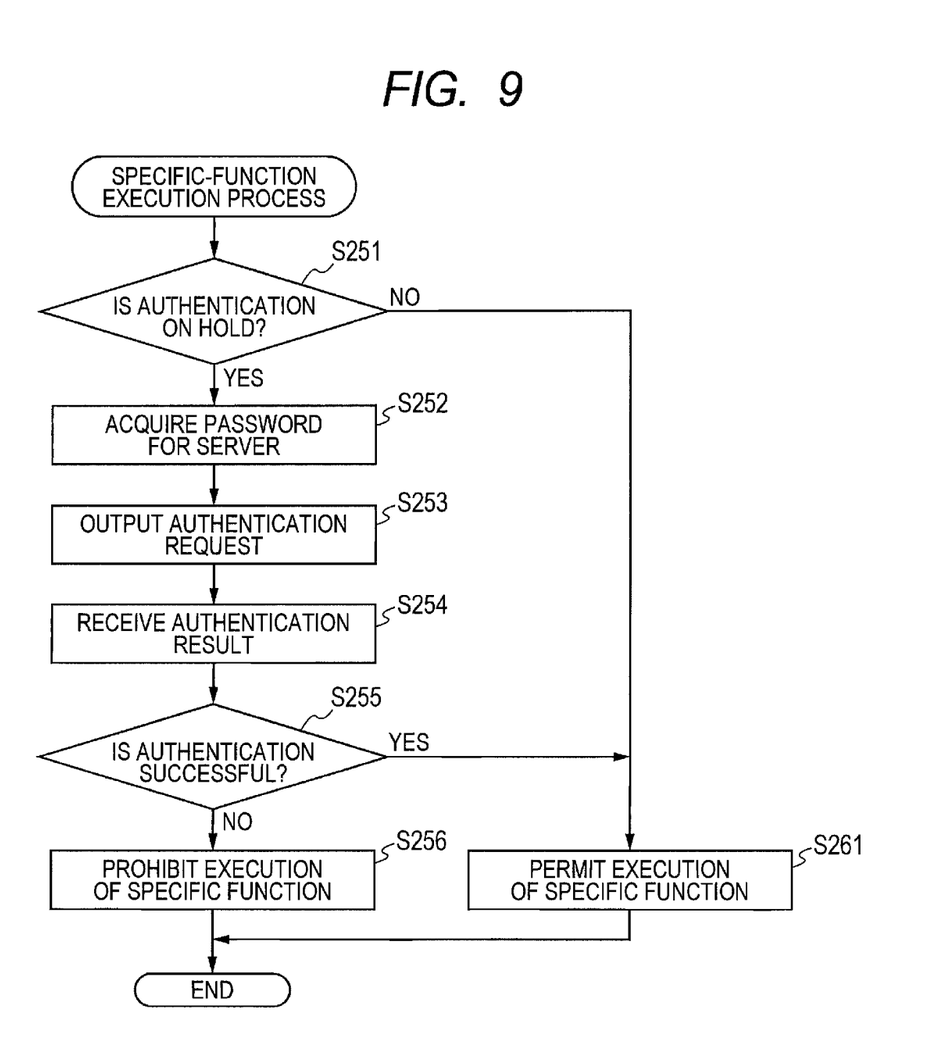
FIG. 9 is a flowchart showing the steps of a specific-function execution process executed by the MFP according to the second embodiment.

Next, a specific-function execution process for determining whether the specific function can be performed will be described while referring to FIG. 9. The CPU 31 executes the specific-function execution process, triggered by reception of a start request for a job that performs the specific function.

In the specific-function execution process, first, the CPU 31 determines whether user authentication is kept on hold (S251). Specifically, in S251, if the information is stored in S205 of the login request process, the CPU 31 determines that user authentication is kept on hold. If no user authentication is kept on hold (S251: NO), execution of the specific function is permitted (S261). Note that, in another example where "FAX" of the restriction information for "User3" in FIG. 3 was "YES", the processes in FIGS. 8 and 9 would be S103: YES (FIG. 8) and S251: NO (FIG. 9).

If user authentication is kept on hold (S251: YES), the CPU 31 acquires a password for user authentication performed at the authentication server 100 (S252). The method of acquiring the password is similar to that in S121 of the login request process. Subsequently, the CPU 31 outputs an authentication request to the authentication server 100 (S253). The password acquired in S252 and the ID of the user in a login state is attached to the authentication request.

Subsequent to S253, the MFP 200 receives an authentication result from the authentication server 100 (S254). Then, the CPU 31 determines whether authentication by the authentication server 100 is successful, based on the received authentication result (S255).

If it is determined that authentication by the authentication server 100 is successful (S255: YES), the CPU 31 permits execution of the specific function (S261). On the other hand, if it is determined that authentication by the authentication server 100 is failed (S255: NO), the CPU 31 prohibits execution of the specific function (S256). Subsequent to S256 or S261, the specific-function execution process ends.

If execution of the specific function is permitted in the specific-function execution process, the MFP 200 starts execution of a job for performing the specific function. If execution of the specific function is prohibited in the specific-function execution process, the MFP 200 cancels execution of a job for performing the specific function.

That is, in the second embodiment, as in the first embodiment, selection is performed whether the apparatus performing user authentication is to be the MFP 200 itself or the authentication server 100, so as to reduce the number of times of user authentication by the authentication server 100. As to the specific function, the login request process is performed tentatively and quickly based on user authentication by the MFP 200 itself so that input of various jobs is permitted, and user authentication by the authentication server 100 is performed at the time of using the specific function. Thus, it is possible to expect both quick completion of the process for login and confidentiality at the time of using the specific function.

In the login request process of the second embodiment, selection is performed whether user authentication by the authentication server 100 is kept on hold, based on the condition in S104. However, user authentication by the authentication server 100 may be kept on hold, based on a condition other than S104.

As described above, in the MFP 200 disclosed in the present specification, user authentication by the MFP 200 itself based on the inputted user information can be selected. And, execution of image processing can be restricted based on the authentication result at the MFP 200, so as to reduce the number of times of user authentication by the server. As a result, it can be expected to suppress delay of the start of a job.

While the invention has been described in detail with reference to the above aspects thereof, it would be apparent to those skilled in the art that various changes and modifications may be made therein without departing from the scope of the claims.

For example, the image processing apparatus is not limited to the MFP 200, but may be applied to any apparatus having an image processing function, such as a copier, a printer, a scanner, a facsimile apparatus, and the like.

In the above-described embodiment, the unregistered record is provided, and generalized restriction information is provided to be applied to all users who are not registered in the user restriction table 341. However, another configuration may be adopted. For example, it may be so configured that the unregistered record is not provided and that users who are not registered in the user restriction table 341 are prohibited from performing all of the image processing.

In the above-described embodiment, if a success result of user authentication is not obtained, all of the image processing is prohibited. However, another configuration may be adopted. For example, a record may be provided in the user restriction table 341, the record being applied to a case where a success result of user authentication is not obtained. And, execution of part of image processing may be permitted based on the restriction information of the record.

In the above-described embodiment, whether the specific function can be used is determined based on the restriction information for each user identified by user information. However, whether the specific function can be used may be determined without identifying the user. In this case, in determination in S104, the MFP 200 determines whether it is possible to perform image processing that is set as the specific function in the specific function table 342 and, if so, determines that the specific function can be performed. Here, a case where facsimile function cannot be performed is a case where no facsimile line is connected, for example.

The processes disclosed in the embodiment may be executed by hardware such as a single CPU, a plurality of CPUs, an ASIC etc., or a combination thereof. Further, the processes disclosed in the embodiment may be realized in various modes such as a recording medium storing program instructions for executing the processes, a method of executing the processes, and the like.

What is claimed is:

1. An image processing apparatus comprising:
    a receiver configured to receive input of authentication information of a user;
    a communicator configured to perform communication with a server;
    an image processor having at least one image processing function;
    a processor; and
    a memory storing user data and storing instructions that, when executed by the processor, cause the processor to perform:
        a selection process of selecting which of the server and the image processing apparatus itself performs user authentication, based on the authentication information and the user data; and
        an authentication process of causing one of the server and the image processing apparatus selected in the selection process to perform the user authentication based on the authentication information; and
        a permission process of permitting the image processor to perform image processing if the user authentication by the authentication process succeeds, and of prohibiting the image processor from performing image processing if the user authentication by the authentication process fails,
    wherein the authentication information includes first user information;

wherein the user data includes second user information and server-authentication information in association with the second user information, the server-authentication information being information indicative of whether user authentication by the server is required;

wherein the memory further stores instructions that, when executed by the processor, cause the processor to perform a user determining process of determining whether the second user information includes the first user information; and wherein the selection process comprises, in response to determining that the second user information includes the first user information, selecting which of the server and the image processing apparatus itself performs the user authentication, based on the server-authentication information in association with the second user information corresponding to the first user information.

2. The image processing apparatus according to claim 1, wherein the memory further stores execution information in association with the user data, the execution information being information indicative of whether each function of the image processor is permitted; and wherein the selection process comprises selecting the server when a specific function is permitted based on the execution information.

3. The image processing apparatus according to claim 2, wherein the memory further stores instructions that, when executed by the processor, cause the processor to perform:

an additional authentication process of causing the server to perform the user authentication, when a job of the specific function is executed after image processing is permitted based on the user authentication by the image processing apparatus itself; and wherein the permission process comprises prohibiting the image processor from performing image processing of the specific function, when the user authentication fails in the additional authentication process.

4. The image processing apparatus according to claim 2, wherein the image processor has a plurality of functions of image processing; and wherein the memory further stores instructions that, when executed by the processor, cause the processor to perform:

a setting process of setting the specific function from among the plurality of functions of image processing.

5. The image processing apparatus according to claim 2, wherein the specific function comprises at least one of facsimile transmission, printing, reading, and copying.

6. The image processing apparatus according to claim 1, wherein the selection process comprises selecting the image processing apparatus itself if the user data includes data of the user identified by the authentication information, and selecting the server if the user data does not include data of the user identified by the authentication information.

7. The image processing apparatus according to claim 2, wherein the image processor has a plurality of functions of image processing; and wherein the memory further stores specific-function setting information indicative of whether each function of the image processing is treated as the specific function, the specific-function setting information being part of the execution information.

8. The image processing apparatus according to claim 7, wherein the selection process comprises selecting the server when the user identified by the authentication information is a user to which execution of the specific function is permitted based on the execution information.

9. The image processing apparatus according to claim 1, wherein the selection process comprises selecting the server when the user identified by the authentication information requires the user authentication to be performed by the server based on the server-authentication information.

10. The image processing apparatus according to claim 1, wherein the image processor has a plurality of functions of image processing;

wherein the memory further stores:
restriction information in association with the user data, the restriction information being information indicative of whether each function of the image processing is permitted; and
specific-function setting information indicative of whether each function of the image processing is treated as a specific function; and wherein the memory further stores instructions that, when executed by the processor, cause the processor to perform:
a hold process of storing information that the user authentication to be performed by the server is kept on hold until a job of the specific function is executed, when the user identified by the authentication information is a user to which execution of the specific function is permitted based on the restriction information and on the specific-function setting information.

11. An image processing apparatus comprising:
a receiver configured to receive input of authentication information of a user;
a communicator configured to perform communication with a server;
an image processor having at least one image processing function;
a processor; and
a memory storing user data and storing instructions that, when executed by the processor, cause the processor to perform:
a selection process of selecting which of the server and the image processing apparatus itself performs user authentication, based on the authentication information and execution information indicative of whether a specific function of the image processor is permitted;
an authentication process of causing one of the server and the image processing apparatus selected in the selection process to perform the user authentication based on the authentication information ; and
a permission process of permitting the image processor to perform image processing if the user authentication by the authentication process succeeds and prohibiting the image processor from performing image processing if the user authentication by the authentication process fails, wherein the authentication information includes first user information;

wherein the user data includes second user information and server-authentication information in association with the second user information, the server-authentication information being information indicative of whether user authentication by the server is required;

wherein the memory further stores instructions that, when executed by the processor, cause the processor to perform a user determining process of determining whether the second user information includes the first user information; and wherein the selection process comprises, in response to determining that the second user information includes the first user information, selecting which of the server and the image processing apparatus itself performs the user authentication, based on the server-authentication information in association with the second user information corresponding to the first user information.

12. An image processing system comprising:
an image processing apparatus having at least one image processing function, the image processing apparatus storing user data and configured to receive input of authentication information of a user; and
a server,
the image processing system being configured to perform:
  a selection process of selecting which of the server and the image processing apparatus performs user authentication, based on the authentication information and the user data;
  an authentication process of causing one of the server and the image processing apparatus selected in the selection process to perform the user authentication based on the authentication information; and
  a permission process of permitting the image processing apparatus to perform image processing if the user authentication by the authentication process succeeds and prohibiting the image processing apparatus from performing image processing if the user authentication by the authentication process fails,
wherein the authentication information includes first user information;
wherein the user data includes second user information and server-authentication information in association with the second user information, the server-authentication information being information indicative of whether user authentication by the server is required;
wherein the image processing system is further configured to perform a user determining process of determining whether the second user information includes the first user information; and
wherein the selection process comprises, in response to determining that the second user information includes the first user information, selecting which of the server and the image processing apparatus itself performs the user authentication, based on the server-authentication information in association with the second user information corresponding to the first user information.

* * * * *